United States Patent Office 3,808,168
Patented Apr. 30, 1974

3,808,168
THERMOSETTING ORGANIC SOLVENT SOLUTION COATING COMPOSITIONS OF N-METHYLOL CONTAINING RESINS AND INORGANIC METAL SALT CATALYSTS
Richard A. Young, Buffalo Grove, and Charles M. Taubman, Flossmoor, Ill., assignors to De Soto, Inc., Des Plaines, Ill.
No Drawing. Filed Dec. 20, 1971, Ser. No. 210,166
Int. Cl. C08g 51/34
U.S. Cl. 260—33.4 R
15 Claims

ABSTRACT OF THE DISCLOSURE

Thermosetting organic solvent solution coating compositions comprising resin containing the N-methylol group and which thermoset on baking through the condensation reaction of said N-methylol group, are catalyzed to cure more rapidly or at lower temperature by incorporating in the coating composition an effective amount up to about 3%, based on the weight of the resin, of dissolved inorganic metal catalytic salt, preferably, a chloride, perchlorate, bromide or nitrate of lithium, magnesium, calcium, barium, zinc or manganese.

---

The present invention relates to thermosetting coatings having improved curing characteristics and more particularly to coating compositions in which the condensation reaction of the N-methylol group of a thermosetting resin component is relied upon for cure with certain inorganic metal salts catalyzing the cure.

Thermosetting coatings in which the N-methylol group or an etherified N-methylol group of a thermosetting resin reacts in a condensation reaction to provide the desired thermosetting cure when a deposited film is baked are well known. Most typically, an alkyd resin is combined with an aminoplast resin, such as a melamine-formaldehyde resin, in an organic solvent solution medium and the solution coating so-provided is deposited on a substrate as a coating thereon and baked to cure the same. The curing reaction is a condensation reaction liberating water when the N-methylol group is unetherified or alcohol when it is etherified. In solution coatings of the type referred to, the melamine resin is usually butylated to enhance solvency and butanol is liberated during the cure. The resins are highly soluble in organic solvents (typically a mixture of aromatic solvents and alcohol such as butanol), but after the cure, solvent solubility is greatly reduced and the cured film is relatively hard and tough.

The N-methylol cure of the thermosetting resin is largely with the hydroxy groups of the alkyd resin, though the carboxyl group of the alkyd help to catalyze the reaction and also participate in the cure. It is frequently desired to speed the cure or lower the curing temperature and this requires an external catalyst which is usually an acid having an organic substituent, very commonly para-toluene sulfonic acid. While such acids provide a catalytic function, they are not fully satisfactory. Most notably, the cured films produced using such acids are not stable. On further exposure to heat (usually encountered on overbaking), reaction continues and the films degrade and become brittle. The same difficulty is encountered at room temperature, but it occurs much more slowly and is known as ageing.

While this invention is applicable to the common alkyd melamine system referred to, it is especially important for the cure of acrylic copolymers containing the N-methylol group in the copolymer chain, e.g., by the interpolymerization of a carboxylic acid amide, such as acrylamide or methacrylamide, which may be methylolated either before, during or after copolymerization.

The resin containing the N-methylol group can, therefore, vary considerably to include the common aminoplast resin such as the solvent-soluble, heat-hardening condensate of urea, melamine or benzoguanamine with excess formaldehyde, these frequently being etherified, as with butanol, to enhance solubility, and also other resins, such as addition copolymers of monoethylenic materials which contain the N-methylol group. These are conveniently supplied by post-methylolating an interpolymer containing an acrylamide or other amide or by copolymerizing monomers including methylol acrylamide or similar monomer.

In accordance with the present invention, a coating composition containing resins which cure on baking by the condensation reaction of the N-methylol group (including ethers thereof with volatile alcohols) are modified to include dissolved inorganic metal salt to an extent of at least 0.25%, based on the weight of resin solids. Such coating compositions, when deposited as a continuous film on a substrate and baked, will cure vigorously, e.g., faster and/or at a lowered curing temperature, and the cure is retained on overbake, thereby avoiding or minimizing the disadvantages of postcuring and ageing. This more vigorous cure to produce a stable cured film is quite surprising since, normally, the more vigorous the cure, the more unstable the cured product.

The essence of this invention is the finding that inorganic metal salts adapted to catalyze the N-methylol cure can be utilized in organic solvent solution coating compositions when the salt is soluble in the solvent and when it is employed in appropriate proportion. When this is done, the N-methylol cure is vigorously catalyzed without interfering with the formation of a continuous and smooth cured coating and the cured coating is remarkably stable.

Inorganic metal salts have previously been found to catalyze the N-methylol cure, but these findings related to aqueous systems intended for the impregnation of fabrics, such as cotton fabrics, for the purpose of imparting wash resistance and wrinkle resistance to the fabric. Insofar as we are aware, it was never appreciated that the catalytic action of these metal salts could be utilized in organic solvent medium or for the deposition of continuous films.

It is known that metals are more easily soluble in organic solvent medium in the form of an organic derivative of the metal, but these organic derivatives are unduly active in solvent-base thermosetting coating systems, provoking gelation of the system and, even when gelation is avoided, the coating is not smooth and uniform. Thus, fatty acid salts of the same metals used herein in appropriate amounts per this invention, tend to gel the system prematurely, causing ridging of the coating even when the coating solution is used prior to gelation. In some organic derivatives, the metal is chelated and does not ionize. In such instance, there is no catalytic action.

In the present invention, the curing agent added to the thermosetting organic solvent solution coating composition is a known catalytic inorganic metal salt, organic derivatives being largely detrimental as noted above. It will be understood that so long as the salt is in solution in the organic solvent solution of the thermosetting coating composition in the proportion discussed hereinafter, that the improved cure will be obtained. Otherwise, the coating compositions which are used herein and which thermoset based on the condensation of the N-methylol group are quite conventional. This is not intended to negate the superiority of certain salts, the fact that certain thermosetting systems are more greatly benefitted, or the fact that solvent selection and salt selection help to assure the required solubility.

The metals which are used to form the salt are preferably selected from lithium, magnesium, calcium, barium, zinc or manganese. Cadmium, chromium, tin, cobalt, iron, nickel and copper are also useful, but less preferred. Cobalt, iron, nickel and copper tend to discolor the coatings and this is a disadvantage, but the catalytic cure is reasonably good. Strontium, aluminum, zirconium and titanium are broadly useful along with rare earths such as cesium and hafnium.

The preferred anion of the salt is a halide, most preferably a chloride or a perchlorate. Bromides are also useful and iodides, while catalytic, tend to discolor. Nitrates are very effective, but tend toward slight discoloration on excessive bake which can be avoided. Slight discoloration is easily tolerated in the darker colors. Phosphates, phosphites, oxychlorides, fluoborates, fluosilicates, sulfates, persulfates, and bisulfates are also useful.

Accordingly, the preferred salts are illustrated by lithium chloride, zinc chloride, magnesium chloride, calcium chloride, and barium chloride. Lithium chloride and bromide are quite good, and lithium is unique. Its solubility and effectiveness are completely different from other alkali metals and it is strongly catalytic, being effective in smaller amounts than any of the other metals noted herein. Indeed, as little as about 0.1% of lithium salt, based on resin solids, has some catalytic effect whereas at least about 0.25% is required for other salts.

The corresponding perchlorates and bromide are also quite useful and the nitrates are quite effective except for their slight discoloration on overbake. There are illustrated by zinc nitrate, magnesium chloride, calcium perchlorate, lithium bromide, tin dichloride, copper chloride, and barium chloride. Still further diverse salts such as zinc fluoborate, and also magnesium, copper, or cobaltic fluoborate, magnesium perchlorate, lithium persulfate, copper persulfate, chromic nitrate and calcium phosphate are useful. Additionally, strontium nitrate, aluminum chloride, lithium bisulfate and zinc oxychloride may be used.

The proportion of dissolved salt is important since, unless at least about 0.25% of dissolved salt is present, based on the weight of resin solids, a significant catalytic effect is not observed except for lithium as previously noted. In practice, it is desirable to operate above the threshold level of about 0.25% since appreciable changes in curing rate and temperature normally require at least about 0.5% of dissolved salt. Preferred proportions are from 0.5–1.5% of dissolved catalytic salt, based on the weight of resin. An upper limit of about 3% is also important because, above this concentration of catalytic salt, there is a tendency to lose adhesion of the coating to the substrate. The prior use of these catalytic salts in aqueous medium for the treatment of fabrics has involved a much larger proportion of catalytic salt than can be tolerated in this invention.

The catalytic salt should be dissolved in the organic solvent medium and some solvents have a greater capacity for dissolving the required proportion of salt. On this basis, alcohols, including ether alcohols, are particularly preferred to constitute at least a portion of the solvent medium to insure the solubility of the catalytic salt. Thus, butanol, propanol, ethanol, 2-butoxy ethanol and 2-ethoxy ethanol will illustrate preferred solvents. Other solvents having preferred capacity for dissolving the catalytic salts are those having a high hydrogen bonding coefficient, such as dimethyl sulfoxide and dimethyl formamide.

Thermosetting coatings in which the N-methylol group or an ether thereof is condensed with hydroxy, carboxy or both in order to cure the same are particularly contemplated herein. While the N-methylol group will react with itself, its reaction with compounds containing hydroxy or carboxy functionality is much faster and the inorganic metal catalytic salts which are used herein are particularly effective to promote the condensation reaction of the N-methylol group with hydroxy and carboxy functionality, and especially with both at the same time.

The purpose in a cure is to have the curing reaction proceed as completely and rapidly as possible to stably form the desired cross-link density. If the desired cross-link density is obtained with an incomplete cure (by increasing the proportion of reactive sites), then overbaking will undesirably continue the cure or the cure will progress slowly at lower temperature. The inorganic metal salts used in this invention cause both the carboxy and hydroxy groups to be rapidly consumed, providing a cured film in which solvent resistance, hardness, flexibility and chemical resistance are all quickly maximized. This is particularly important where the N-methylol groups are part of an interpolymer largely constituted by copolymerized monoethylenically unsaturated monomers since, then, only a single resinous material is present and this minimizes compatibility problems and permits film properties to be maximized. Such interpolymers are commonly based on methylolated acrylamide which is used in an amount of 2–50% of the weight of the copolymer, preferably from 4–20% and are illustrated in U.S. Pats. No. 3,257,475, issued June 21, 1966 and 3,607,802 issued Sept. 21, 1971, both to Kazys Sekmakas.

Such interpolymers are frequently formed to include carboxyl functionality to provide internal catalysis, very little acidity being required for this purpose since an acid number of from 3–20 is normally adequate. This internal catalysis is helpful since the ordinary external catalysts are deterimental as discussed hereinbefore. The catalytic metal salts of this invention dominate the curing characteristics of the system so that any carboxyl functionality present simply serves as a coreactant.

It wil lbe appreciated that this invention applies to coatings regardless of whether they are clear or pigmented and that the coatings will be formulated using conventional techniques well known in the coating industry, and that they may include waxes, lubricants, foam control agents, and other conventional components as is common practice in the art.

The invention is illustrated in the following example wherein the resin containing the N-methylol group is a thermosetting methylolated acrylamide interpolymer provided in organic solvent solution, and particularly in a solvent medium which contains butanol and 2-butoxy ethanol in admixture with aromatic hydrocarbon solvents. This interpolymer and its production are disclosed in detail in the example of U.S. Pat. No. 3,607,802, which is reported beginning at column 3, line 5 of said patent.

The present example employs the interpolymer solution defined at column 4, lines 20–25 of said Pat. 3,607,802, this solution being formulated into a gloss coil coating enamel using titanium dioxide rutile in a pigment to binder ratio of 1:1; and there is mixed into the pigmented solution a 10% solution of zinc nitrate in butanol, the solution of zinc nitrate being added in an amount to provide 0.75 part by weight of zinc nitrate per 100 parts of resin solids. This paint is then adjusted with an aromatic hydrocarbon solvent having a boiling range of 375–410° F. to provide an appropriate application viscosity (30 seconds ± 2 seconds in a No. 4 Zahn Cup).

A film illustrative of this invention can be prepared by drawing down on an 019 Bonderized treated aluminum panel a small amount of paint with a wire wound rod (size 30 to 34 for dry film thicknesses of 0.8 to 1.0 mil). The wet paint film is then cured by placing the panel in a gas oven at 500° F. for 35 to 40 seconds. The metal panel will reach a peak metal temperature during this period of approximately 400° F. This is sufficient to yield a system which is solvent resistant (pass 100 double methyl ethyl ketone rubs) and flexible (pass 1 thickness bend and 30–40 in./lbs. reverse impact).

In contrast, and in the absence of the zinc nitrate, an adequate cure requires 60 second exposure in an oven maintained at a temperature of 525° F.

The invention is defined in the claims which follow.

We claim:
1. A thermosetting organic solvent solution coating composition adapted to deposit coatings which thermoset on baking to form continuous and smooth solvent resistant cured coatings through the condensation reaction of the N-methylol group, comprising organic solvent having dissolved therein resin containing the N-methylol group or an ether thereof with a volatile alcohol, said organic solvent having dissolved therein an effective amount up to about 3%, based on the weight of resin, of inorganic metal salt adapted to catalyze the N-methylol cure, the metal of said metal salt being selected from lithium, magnesium calcium, barium, zinc, manganese, cadmium, chromium, tin, cobalt, iron, nickel, copper, strontium, aluminum, zirconium, titanium, and rare earths.

2. A coating composition as recited in claim 1 in which said metal salt is employed in an amount of from about 0.25% to about 2% based on the weight of resin.

3. A coating composition as recited in claim 1 in which said metal salt is selected from chlorides, perchlorates, bromides, and nitrates of lithium, magnesium, calcium, barium, zinc, and manganese.

4. A coating composition as recited in claim 1 in which said metal salt is a nitrate.

5. A coating composition as recited in claim 1 in which said metal salt is a chloride.

6. A coating composition as recited in claim 1 in which said metal salt is present in an amount of from 0.5–1.5%, based on the weight of resin.

7. A coating composition as recited in claim 1 in which the metal of said metal salt is lithium and said salt is present in an amount of at least about 0.1%, based on the weight of resin.

8. A coating composition as recited in claim 1 in which said organic solvent comprises an alcohol.

9. A coating composition as recited in claim 1 in which said coating composition further comprises resin providing the hydroxy or carboxyl group.

10. A coating composition as recited in claim 1 in which said coating composition comprises an interpolymer containing methylol acrylamide or an ether thereof with a volatile alcohol.

11. A coating composition as recited in claim 10 in which said interpolymer further includes carboxyl functionality.

12. A coating composition as recited in claim 10 in which said interpolymer further includes hydroxy functionality.

13. A coating composition as recited in claim 1 in which said coating composition cures by the simultaneous condensation of the N-methylol group with both carboxyl and hydroxy functionality.

14. A thermosetting organic solvent solution coating composition adapted to deposit coatings which thermoset on baking to form continuous and smooth solvent resistant cured coatings through the condensation reaction of the N-methlol group, comprising organic solvent comprising an alcohol having dissolved therein an acrylic copolymer containing 4–20% of methylolated acrylamide or an ether thereof with a volatile alcohol, said organic solvent further having dissolved therein from about 0.25% up to about 3%, based on the weight of said copolymer, of inorganic metal salt adapted to catalyze the N-methylol cure, the metal of said metal salt being selected from magnesium, calcium, barium, zinc, manganese, cadmium, chromium, tin, cobalt, iron, nickel, copper, strontium, aluminum, zirconium, titanium, and rare earths.

15. A thermosetting organic solvent solution coating composition adapted to deposit coatings which thermoset on baking to form continuous aand smooth solvent resistant cured coatings through the condensation reaction action of the N-methylol group, comprising organic solvent comprising an alcohol having dissolved therein an acrylic copolymer containing 4–20% of methylolated acrylamide or an ether thereof with a volatile alcohol, said organic solvent further having dissolved therein from about 0.1% up to about 3%, based on the weight of said copolymer, of a chloride, perchlorate, bromide, or nitrate of lithium.

References Cited
UNITED STATES PATENTS

| | | | |
|---|---|---|---|
| 3,389,125 | 6/1968 | Dietrick | 260—54 |
| 3,624,038 | 11/1971 | Weidner | 260—53 |
| 3,624,035 | 11/1971 | Portatius | 260—67.6 R |
| 3,607,802 | 8/1971 | Sekmakas | 260—21 |
| 3,471,466 | 10/1969 | Hayes | 260—21 |
| 3,399,153 | 8/1968 | Sekmakas | 260—21 |
| 3,257,425 | 6/1966 | Sekmakas | 260—850 |
| 3,016,283 | 1/1962 | Schappel | 260—72 R X |
| 2,653,921 | 9/1953 | Sulzer | 260—67.6 |

ALLAN LIEBERMAN, Primary Examiner

R. ZAITLEN, Assistant Examiner

U.S. Cl. X.R.

260—72 R, 30.8 DS, 32.6 N